(12) United States Patent
Zarins (10) Patent No.: US 12,181,083 B2
(45) Date of Patent: Dec. 31, 2024

(54) PIPE COUPLING (71) Applicant: Applied System Technologies, Inc., Charlotte, NC (US)

(72) Inventor: Roman Todd Zarins, Denver, NC (US)

(73) Assignee: Applied System Technologies, Inc., Denver, NC (US)

( * ) Notice: Subject to any disclaimer, the term of this patent is extended or adjusted under 35 U.S.C. 154(b) by 103 days.

(21) Appl. No.: 17/870,699

(22) Filed: Jul. 21, 2022

(65) Prior Publication Data
US 2024/0027004 A1  Jan. 25, 2024

(51) Int. Cl.
*F16L 23/08* (2006.01)
*F16L 23/22* (2006.01)

(52) U.S. Cl.
CPC ............. *F16L 23/22* (2013.01); *F16L 23/08* (2013.01)

(58) Field of Classification Search
CPC ....... F16L 17/04; F16L 17/035; F16L 21/065; F16L 23/08; F16J 15/022
See application file for complete search history.

(56) References Cited

U.S. PATENT DOCUMENTS

| | | | |
|---|---|---|---|
| 2,028,182 A | 1/1936 | Barnickol, Jr. | |
| 2,041,132 A | 5/1936 | Johnson | |
| 2,752,173 A | 6/1956 | Krooss | |
| 3,054,629 A | 9/1962 | Piatek | |
| 3,695,638 A * | 10/1972 | Blakeley | F16L 17/04 285/423 |
| 4,408,788 A | 10/1983 | Beukema | |
| 4,417,755 A * | 11/1983 | Gittleman | F16L 21/065 285/423 |
| 4,471,979 A | 9/1984 | Gibb et al. | |
| 4,522,434 A * | 6/1985 | Webb | F16L 17/04 285/368 |
| 4,601,495 A * | 7/1986 | Webb | F16L 17/04 285/368 |
| 4,611,839 A | 9/1986 | Rung et al. | |
| 4,702,499 A * | 10/1987 | deRaymond | F16L 17/04 285/912 |
| 4,726,611 A * | 2/1988 | Sauer | F16L 17/04 285/236 |

(Continued)

FOREIGN PATENT DOCUMENTS

| | | | | |
|---|---|---|---|---|
| CN | 111365334 A | * | 7/2020 | ............. F16L 21/065 |
| KR | 101901387 B1 | * | 9/2018 | ............. F16L 17/04 |

(Continued)

*Primary Examiner* — Matthew Troutman
*Assistant Examiner* — Fannie Kee
(74) *Attorney, Agent, or Firm* — Seth L. Hudson; Maynard Nexsen PC (57) ABSTRACT A coupling for joining a first pipe segment to a second pipe segment that includes a first coupling segment and second coupling segment that has a first end, a second end, an outer surface, and an inner surface. Fastener openings are disposed on the first end and the second end, and the outer surface is contoured to define an arched shape that is higher towards an axial midpoint and lower towards the first end and the second end. The outer surface contains a band, a first skirt, and a second skirt on each side of the band. A seal groove is defined on the inner surface between two outer edges of the first coupling segment and a seal is disposed within the seal grove.

13 Claims, 12 Drawing Sheets (56) References Cited

U.S. PATENT DOCUMENTS

| | | |
|---|---|---|
| 5,354,108 A | 10/1994 | Sandor |
| 5,911,446 A * | 6/1999 | McLennan ............... F16L 17/04 285/104 |
| 6,076,861 A | 6/2000 | Ikeda |
| 6,450,551 B1 * | 9/2002 | Lee ........................ F16L 17/04 285/55 |
| 7,086,131 B2 | 8/2006 | Gibb et al. |
| 7,090,259 B2 | 8/2006 | Dole |
| 7,472,911 B2 | 1/2009 | Sun et al. |
| 7,516,636 B2 * | 4/2009 | Dole ........................ F16L 17/04 72/105 |
| 7,540,540 B2 | 6/2009 | Kwon et al. |
| 7,722,087 B2 | 5/2010 | Dole et al. |
| 7,789,434 B2 | 9/2010 | Nagle et al. |
| 7,818,869 B2 | 10/2010 | Dole et al. |
| 7,921,536 B2 | 4/2011 | Dole |
| 7,988,207 B2 * | 8/2011 | Dole ........................ F16L 17/04 285/112 |
| 8,069,547 B2 | 12/2011 | Gibb et al. |
| 8,136,847 B2 | 3/2012 | Madara et al. |
| RE44,444 E | 8/2013 | Dole et al. |
| 8,556,302 B2 | 10/2013 | Dole |
| 8,819,914 B2 | 9/2014 | Porter et al. |
| 9,169,952 B2 | 10/2015 | Horgan |
| 9,285,061 B2 | 3/2016 | Ikeda et al. |
| 9,388,922 B2 | 7/2016 | Dole |
| 9,395,024 B2 | 7/2016 | Bancroft et al. |
| 9,404,608 B2 | 8/2016 | Lippka |
| 9,435,469 B2 | 9/2016 | Bancroft et al. |
| 9,528,642 B2 | 12/2016 | Bancroft |
| 9,770,796 B2 | 9/2017 | Hagiya |
| 9,958,095 B2 | 5/2018 | Blease et al. |
| 10,100,957 B2 | 10/2018 | Bowman |
| 10,190,707 B2 | 1/2019 | Brandt et al. |
| 10,207,320 B2 | 2/2019 | Schell et al. |
| 10,385,997 B2 | 8/2019 | Beagen, Jr. |
| 10,408,368 B2 | 9/2019 | Bancroft et al. |
| 10,641,419 B2 | 5/2020 | Ohnemus et al. |
| 10,711,929 B1 * | 7/2020 | Lu ........................ F16L 21/065 |
| 11,209,107 B2 * | 12/2021 | McNamara ............. F16L 17/04 |
| 2005/0253383 A1 * | 11/2005 | Gibb ....................... F16L 17/04 285/112 |
| 2009/0127846 A1 * | 5/2009 | Dole ................... F16L 21/065 285/24 |
| 2009/0200799 A1 * | 8/2009 | Dole ........................ F16L 17/04 285/341 |
| 2011/0062706 A1 * | 3/2011 | Henry ..................... F16L 17/04 285/356 |
| 2012/0235405 A1 * | 9/2012 | Dole ........................ F16L 23/08 285/337 |
| 2014/0070529 A1 * | 3/2014 | Bancroft .................. F16L 17/04 285/337 |
| 2015/0176728 A1 * | 6/2015 | Bowman .................. F16L 17/04 285/321 |
| 2018/0163905 A1 | 6/2018 | Ohnemus et al. |
| 2018/0347730 A1 * | 12/2018 | Bancroft .................. F16L 17/04 |
| 2019/0145556 A1 * | 5/2019 | Kim ........................ F16L 17/04 277/605 |
| 2020/0049285 A1 | 2/2020 | Lee |

FOREIGN PATENT DOCUMENTS

| | | |
|---|---|---|
| WO | 2008/012893 A1 | 1/2008 |
| WO | 2020/100074 A1 | 5/2020 |
| WO | 2020/119654 A1 | 6/2020 |
| WO | 2020/119655 A1 | 6/2020 |
| WO | 2020/140424 A1 | 7/2020 |

* cited by examiner

PIPE COUPLING

FIELD OF THE INVENTION

The present invention relates generally to a pipe coupling, and more generally relates to a pipe coupling containing a first coupling segment and a second coupling segment, containing a seal therein for engaging two ends of separate pipes for joining them together.

BACKGROUND OF THE INVENTION

Pipes or hoses usually are manufactured in standard lengths that do not correspond to the lengths needed for installation, where multiple pipes or hoses need to be combined to cover the entire length of a factory floor for example. Pipes or hoses may also need to be shortened and attached to another pipe or hose during the installation process. Further, pipes or hoses, depending upon the installation and intended use, may need to be attached to an adaptor or other structure to introduce or divert the fluid flowing through the pipe or hose. In all of these scenarios, a quick, efficient, and productive apparatus and method must be utilized to connect a first pipe or hose segment to a second pipe or hose segment. Likewise, a quick, efficient, and productive apparatus and method need to be utilized to connect a pipe or hose segment to another adaptor or device. It is an object of the present invention to provide a pipe coupling for quickly and efficiently connect two pipe or hose segments or a pipe or hose segment to an apparatus or device.

BRIEF SUMMARY OF THE INVENTION

According to an embodiment of the present invention, a coupling for joining a first pipe segment to a second pipe segment that includes a first coupling segment having a first end, a second end, an outer surface, and an inner surface. Fastener openings are disposed on the first end and the second end, and the outer surface is contoured to define an arched shape that is higher towards an axial midpoint and lower towards the first end and the second end. The outer surface contains a band, a first skirt, and a second skirt on each side of the band. A seal groove is defined on the inner surface between two outer edges of the first coupling segment. A first rib is disposed between the seal groove and one outer edge, and a second rib is disposed between the seal groove and the opposed outer edge. A first transition portion provides a transition between the outer edge of the seal groove and the first rib, and a second transition portion provides a transition between the outer edge of the seal groove and the second rib. A second coupling segment has a first end, a second end, an outer surface, and an inner surface. Fastener openings are disposed on the first end and the second end. The outer surface is contoured to define an arched shape that is higher towards an axial midpoint and lower towards the first end and the second end. The outer surface contains a band and a first skirt and a second skirt on each side of the band. A seal groove is defined on the inner surface between two outer edges of the second coupling segment. A first rib is disposed between the seal groove and one outer edge, and a second rib is disposed between the seal groove and the opposed outer edge. A first transition portion provides a transition between the outer edge of the seal groove, and the first rib and a second transition portion provides a transition between the outer edge of the seal groove and the second rib. A seal is disposed within the seal grove.

According to another embodiment of the present invention, the coupling includes a first fastening device and a second fastening device, the first fastening device is received within the fastener openings on the first end of the first coupling segment and the second coupling segment and the second fastening device is received within the fastener openings on the second end of the first coupling device and the second coupling device, the first fastening device and the second fastening device selectively secure the first coupling segment to the second coupling segment for joining a first pipe segment to a second pipe segment.

According to yet another embodiment of the present invention, the coupling includes a seal within the seal groove of the first coupling segment and the seal groove of the second coupling segment.

According to yet another embodiment of the present invention, the coupling includes a first rib of the first coupling segment and the second coupling segment has a first end and a second end, the height of the first rib increases as it progresses from the first end to a predetermined point on the first rib and decreases in height from the predetermined point to the second end.

According to yet another embodiment of the present invention, the coupling includes a first rib of the first coupling segment and the second coupling segment has a first end and a second end, the height of the first rib increases as it progresses from the first end to a midpoint on the first rib and decreases in height from the midpoint to the second end.

According to yet another embodiment of the present invention, the coupling includes a second rib of the first coupling segment and the second coupling segment has a first end and a second end, the height of the second rib increases as it progresses from the first end to a predetermined point on the second rib and decreases in height from the predetermined point to the second end.

According to yet another embodiment of the present invention, the coupling includes a second rib of the first coupling segment and the second coupling segment has a first end and a second end, the height of the second rib increases as it progresses from the first end to a midpoint on the second rib and decreases in height from the midpoint to the second end.

According to yet another embodiment of the present invention, the coupling includes a first coupling segment and second coupling segment is composed of powdered coated aluminum.

According to yet another embodiment of the present invention, the coupling includes a band of the first coupling segment or the second coupling segment that contains an indicia marking portion.

According to yet another embodiment of the present invention, the coupling includes a seal that includes a radially outer surface that contains at least one groove disposed between edge portions of the radially outer surface. A pair of side portions extend axially downward from the edge portions of the radially outer surface. A pair of sealing surfaces extend radially inwardly from the side portions, and a center rib is disposed internally of the seal. A pair of gasket channels are disposed on either side of the center rib that are tubular channels extending internally of the seal.

According to yet another embodiment of the present invention, the radially outer surface of the seal contains two or more grooves.

According to yet another embodiment of the present invention, the radially outer surface of the seal contains a plurality of grooves.

According to yet another embodiment of the present invention, the center rib contains two or more notches within an exterior portion of the center rib.

According to yet another embodiment of the present invention, the center rib of the seal contains four notches spaced an equal distance apart from each other along an exterior portion of the center rib.

According to yet another embodiment of the present invention, a method for using a coupling to join a first pipe segment to a second pipe segment that includes a coupling for joining a first pipe segment to a second pipe segment that includes a first coupling segment having a first end, a second end, an outer surface, and an inner surface. Fastener openings are disposed on the first end and the second end, and the outer surface is contoured to define an arched shape that is higher towards an axial midpoint and lower towards the first end and the second end. The outer surface contains a band, a first skirt, and a second skirt on each side of the band. A seal groove is defined on the inner surface between two outer edges of the first coupling segment. A first rib is disposed between the seal groove and one outer edge, and a second rib is disposed between the seal groove and the opposed outer edge. A first transition portion provides a transition between the outer edge of the seal groove and the first rib, and a second transition portion provides a transition between the outer edge of the seal groove and the second rib. A second coupling segment has a first end, a second end, an outer surface, and an inner surface. Fastener openings are disposed on the first end and the second end. The outer surface is contoured to define an arched shape that is higher towards an axial midpoint and lower towards the first end and the second end. The outer surface contains a band and a first skirt and a second skirt on each side of the band. A seal groove is defined on the inner surface between two outer edges of the second coupling segment. A first rib is disposed between the seal groove and one outer edge, and a second rib is disposed between the seal groove and the opposed outer edge. A first transition portion provides a transition between the outer edge of the seal groove, and the first rib and a second transition portion provides a transition between the outer edge of the seal groove and the second rib. A seal is disposed within the seal grove. Placing an end of the first pipe segment between the first coupling segment and the second coupling segment, and placing an end of the second pipe segment between the first coupling segment and the second coupling segment. The first coupling segment is secured to the second coupling segment.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
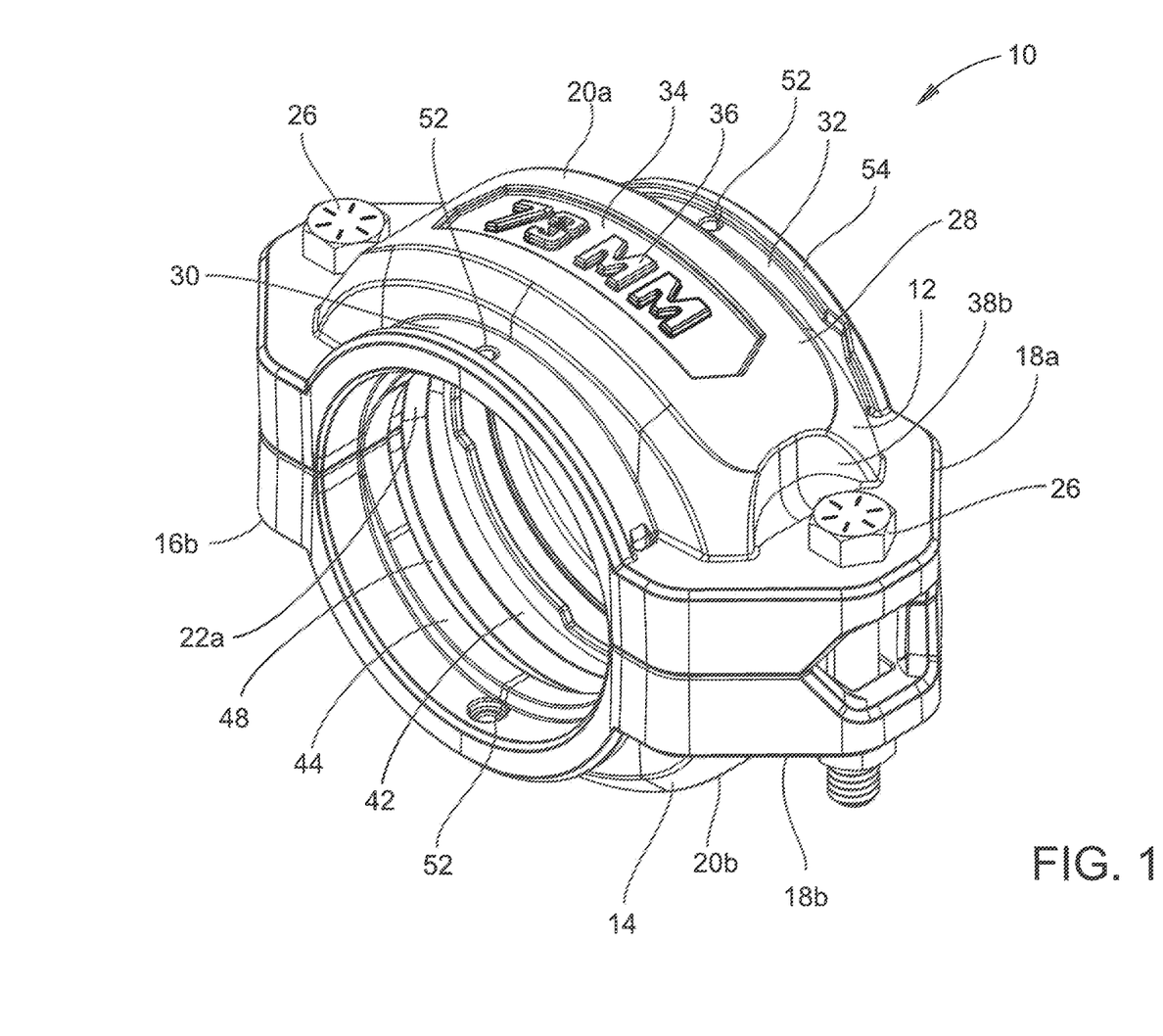
FIG. 1 is a perspective view of the coupling.

Referring now specifically to the drawings, a pipe coupling is illustrated in FIG. 1 and is shown generally at reference numeral 10. The pipe coupling 10 contains a first coupling segment 12 and a second coupling segment 14. The first coupling segment 12 and the second coupling segment 14 may be identical. As illustrated in FIGS. 1-7, the first coupling segment 12 and the second coupling segment 14 are identical. The first coupling segment 12 contains a first end 16a, a second end 18a, an outer surface 20a, and an inner surface 22a. The second coupling segment 14 contains a first end 16b, a second end 18b, an outer surface 20b, and an inner surface 22b.

Figure 4:
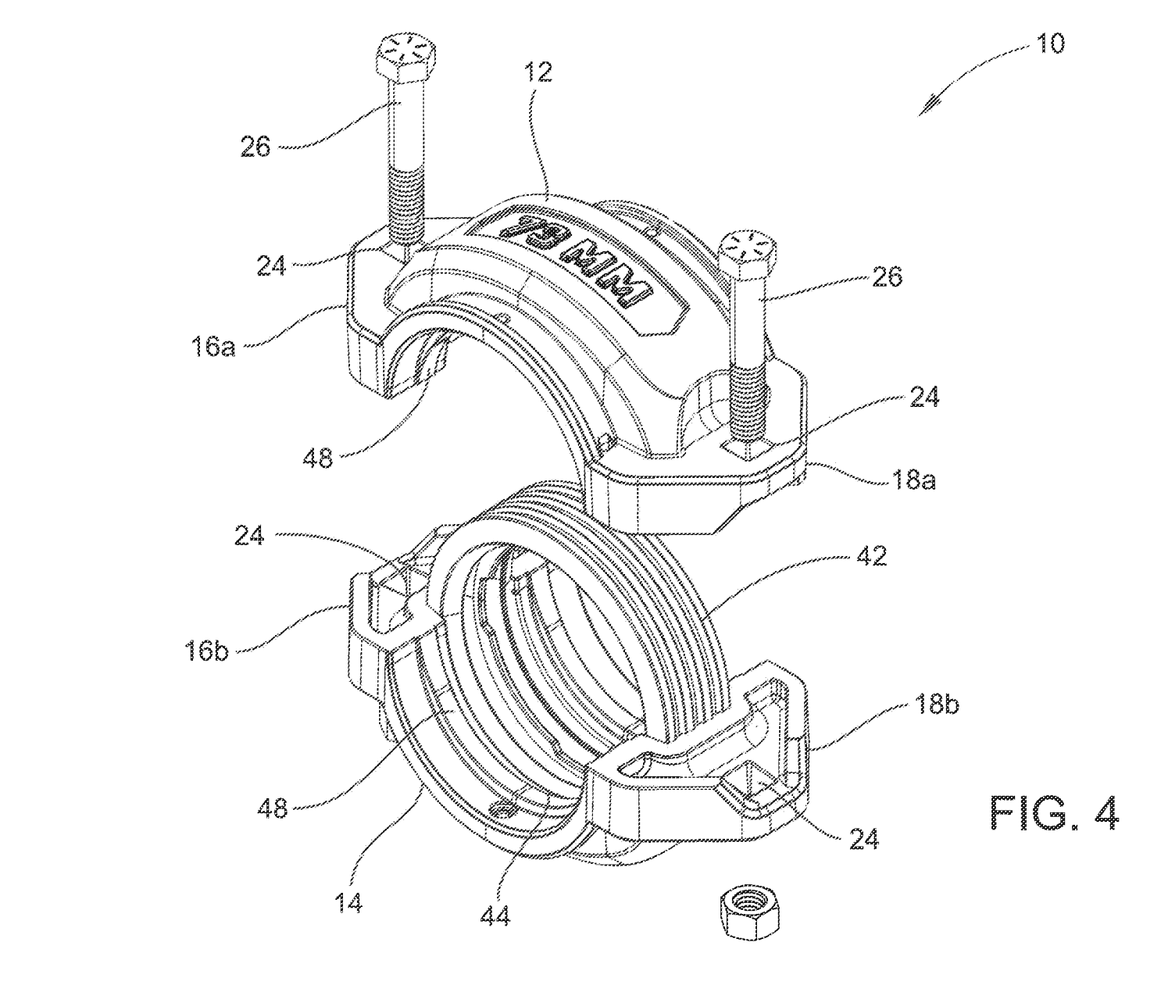
FIG. 4 is a partial exploded view of the coupling.

Fastener openings 24 are disposed on the first end (16a, 16b) and the second end (18a,18b) of each coupling segment (12,14) for receiving fastening devices 26 for selectively securing the first coupling segment 12 to the second coupling segment 14, as shown in FIG. 4. As illustrated, the fastening devices 26 may be two bolts disposed through fastener openings 24 on the first end (16a,16b) and the second end (18a,18b) of each coupling segment (12,14) that interacts with nuts in a threaded arrangement. However, other types of fastening devices 26 may be used. As illustrated, the fastener openings 24 are square, but any shape allowing the fastener openings 24 to receive fastener devices 26 may be utilized.

The outer surface (20a,20b) of each coupling segment (12,14) is gently contoured to define an arched shape that is higher (or more radially outward) towards an axial midpoint of each coupling segment (12,14) and lower (or more radially inwards) towards the first end 16a, 16b and the second end 18a, 18b of each coupling segment (12, 14). The outer surface 20a, 20b contains a centrally located band 28 and a first skirt 30 and a second skirt 32 are disposed on either side of the centrally located band 28 and proximate the sides of the coupling segment (12,14). The centrally located band 28 is disposed within the center of the outer surface 20*a*, 20*b* of the coupling segments (12,14) and has a height that is greater than the exterior surface of the first skirt 30 and second skirt 32. The centrally located band 20 has a shape that mirrors the outer surface 20*a*, 20*b* of the coupling segments (12,14) that is gently contoured to define an arched shape that is higher (or more radially outward) towards an axial midpoint of each coupling segment (12,14) and lower (or more radially inwards) towards the first end 16*a*, 16*b* and the second end 18*a*, 18*b* of each coupling segment (12,14). The centrally located band 28 terminates at the first end 16*a*, 16*b* and the second end 18*a*, 18*b* of each coupling segment (12,14). The centrally located band 28 contains an indentation, centrally located within the band 28 proximate the first end 16*a*, 16*b* and the second end 18*a*, 18*b* of each coupling segment (12,14). As illustrated, the indentation has a generally parabolic shape and is recessed within the band 28.

Figure 5:
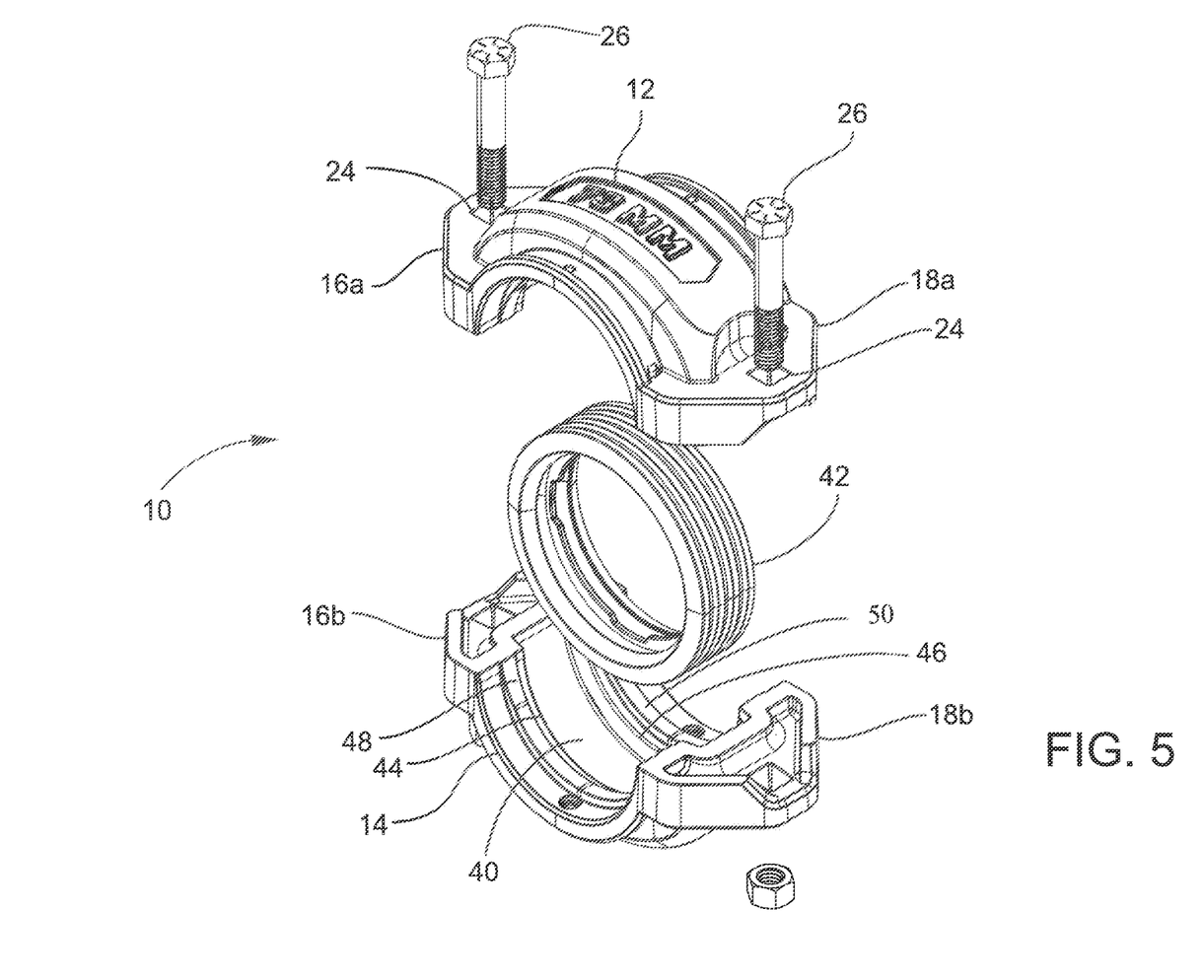
FIG. 5 is an exploded view of the coupling.

The band 28 can contain an indicia marking portion 34 which may be a raised structure at a height above the remaining surface of the exterior surface of the band 28. As shown in FIGS. 1, 4, and 5, the indicia marking portion 34 is raised above the exterior surface of the band 28 and has a different elevation than the remaining surface of the band 28. Alternatively, the indicia marking portion 34 may be recessed within the band 28. In other words, the indicia marking portion 34 may be disposed within the band 28 and below the outer surface of the band 28. Indicia 36 are designed to be positioned on or within the indicia marking portion 34. The indicia 36 may be in the form of text, symbols, and/or colors. The text, symbols, and/or colors may be molded, imprinted, and/or marked on the surface or within the indicia marking portion 34. The indicia 36 may contain a company name, trademark, logo and the like.

The first skirt 30 and the second skirt 32 may also contain indicia. The indicia may be in the form of text, symbols, and/or colors. The text, symbols, and/or colors may be molded, imprinted, and/or marked on the surface or within the first skirt 30 and the second skirt 32. The indicia may contain a company name, trademark, logo and the like.

The centrally located band 28 contains an indentation 38*a*, 38*b*, centrally located within the band 28 proximate the first end 16*a*, 16*b* and the second end 18*a*, 18*b* of each coupling segment (12,14). As illustrated in FIGS. 1-4, the indentation 38*a*, 38*b* has a generally parabolic shape and is recessed within the band 28.

Figure 2:
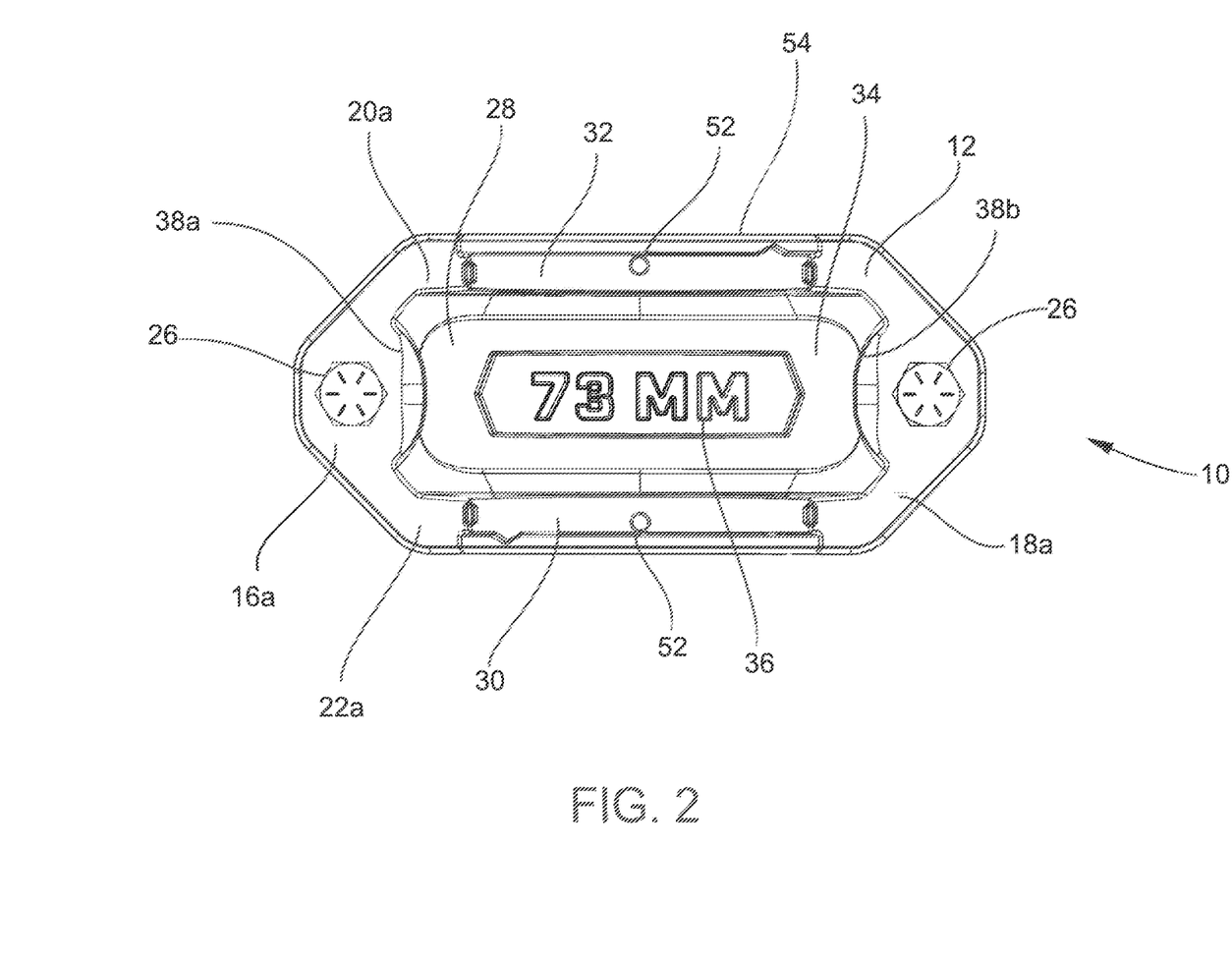
FIG. 2 is a top view of the coupling.
Figure 3:
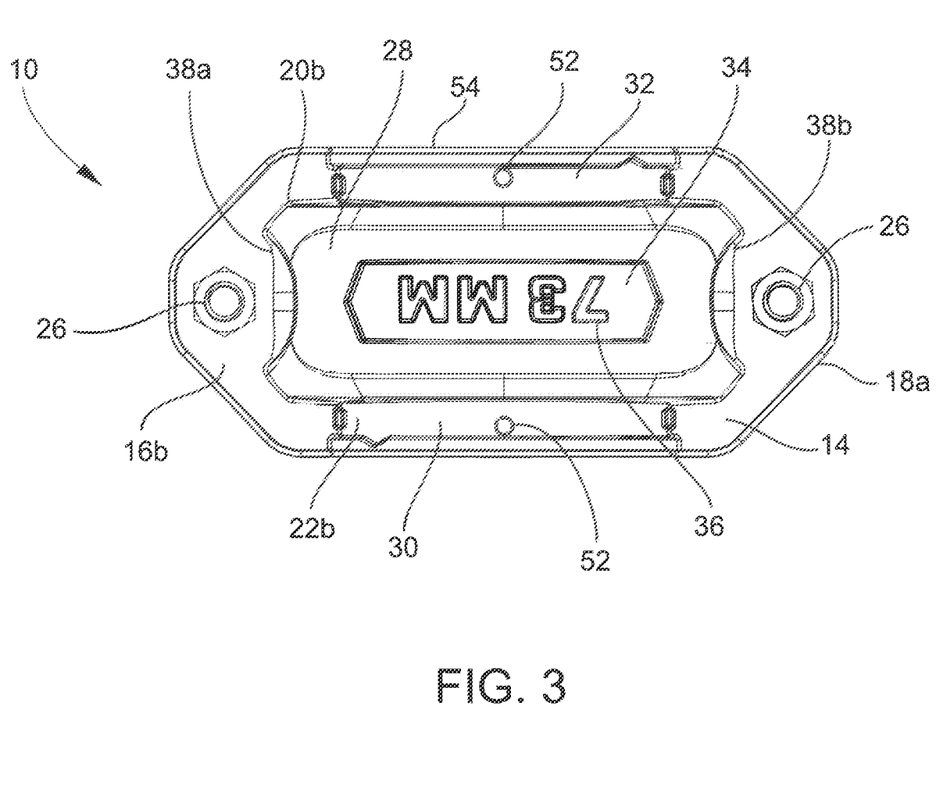
FIG. 3 is a bottom view of the coupling.

As shown in FIGS. 2 and 3, the first end 16*a*, 16*b* contains a generally triangular shape. The first end 16*a*, 16*b* contains an external surface, an interior surface, a back portion, two side portions, and a front portion. The back portion is adjacent to each end of the first skirt 30, the second skirt 32, and band 28. The external surface of the first end 16*a*, 16*b* is generally flat and extends outward from the first skirt 30, the second skirt 32, and band 28 to an edge surrounding the first end 16*a*, 16*b*. A first side portion and a second side portion extend downwardly from the first end 16*a*, 16*b*, forming a cavity formed by the interior surfaces of the first side portion, second side portion, and interior surface. The edge forming the intersection between the first side portion and the second side portion with the exterior surface is preferably chamfered as shown in FIGS. 1, 4, and 5. The width of the first end 16*a*, 16*b* decreases from the back portion to the front portion. In other words, the width of the first end 16*a*, 16*b* at the back portion is greater than the width at the front portion. The front portion of the first end 16*a*, 16*b* is preferably rounded, without a point. The portions of the first side portion and the second side portion are tapered at the front end, meaning the bottom edge of the first side portion and the second side portion are angled, upward, towards the interior surface, prior to leveling off, wherein the bottom edge is generally straight at the front portion. The first side portion and the second side portion meet at the front portion.

As shown in FIGS. 2 and 3, the first end 18*a*, 18*b* contains a generally triangular shape. The first end 18*a*, 18*b* contains an external surface, an interior surface, a back portion, two side portions, and a front portion. The back portion is adjacent to each end of the first skirt 30, the second skirt 32, and band 28. The external surface of the first end 18*a*, 18*b* is generally flat and extends outward from the first skirt 30, the second skirt 32, and band 28 to an edge surrounding the first end 18*a*, 18*b*. A first side portion and a second side portion extend downwardly from the first end 18*a*, 18*b*, forming a cavity formed by the interior surfaces of the first side portion, second side portion, and interior surface. The edge forming the intersection between the first side portion and the second side portion with the exterior surface is preferably chamfered as shown in FIGS. 1, 4, and 5. The width of the first end 18*a*, 18*b* decreases from the back portion to the front portion. In other words, the width of the first end 18*a*, 18*b* at the back portion is greater than the width at the front portion. The front portion of the first end 18*a*, 18*b* is preferably rounded, without a point. The portions of the first side portion and the second side portion are tapered at the front end, meaning the bottom edge of the first side portion and the second side portion are angled, upward, towards the interior surface, prior to leveling off, wherein the bottom edge is generally straight at the front portion. The first side portion and the second side portion meet at the front portion.

The first end 16*a*,*b* and the second end 18*a*,*b* each contain a generally triangular shaped cavity. The triangularly shaped cavities of the first end 16*b* and the second end 18*b* on the second coupling segment are illustrated in FIGS. 4 and 5. An identical triangularly shaped cavity is contained on the first end 16*a* and 18*a* of the first coupling segment 12.

Figure 7:
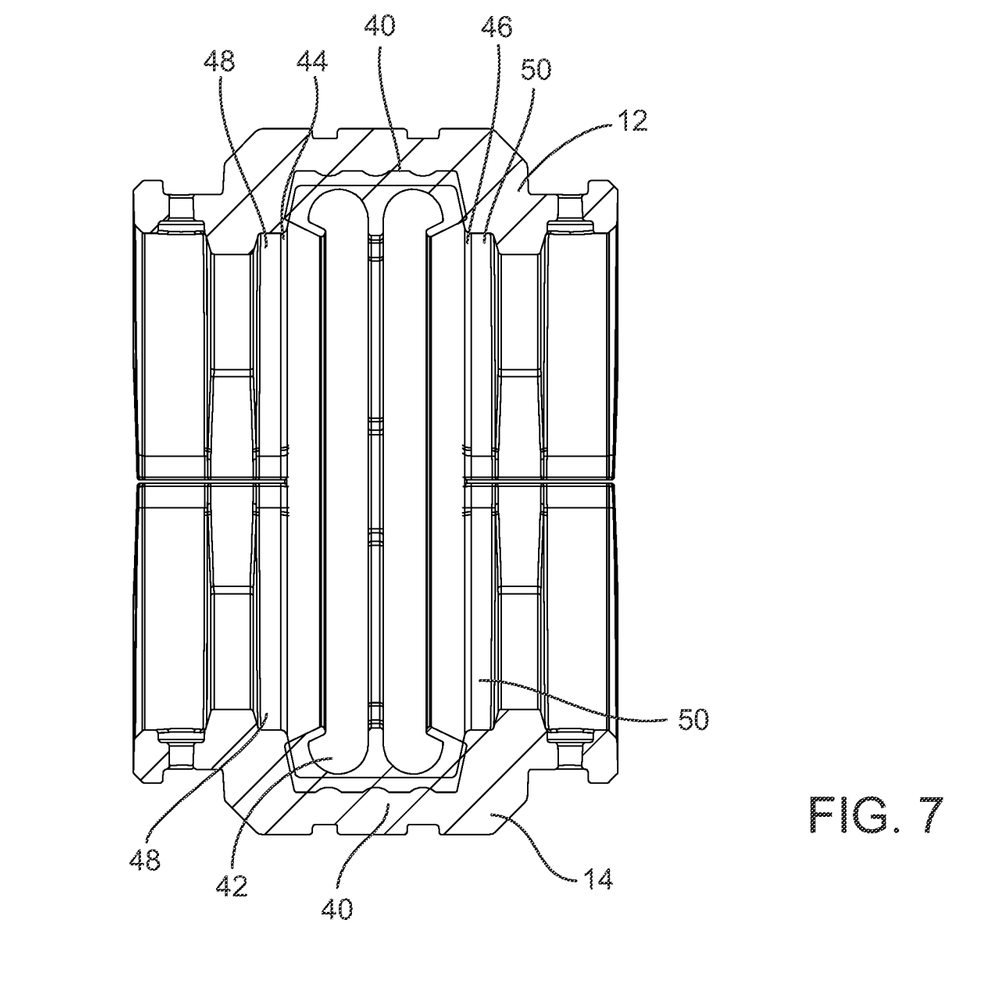
FIG. 7 is a cut-away view of the coupling along line A-A of FIG. 6.

A seal groove 40, as shown in FIGS. 5 and 7, is defined in the inner surfaces of the first coupling segment 12 and the second coupling segment 14. A seal 42 is received within the seal groove 40. Each inner surface also defines a first transition portion 44 and a second transition portion 46. The first transition portion 44 provides a transition between the outer edge of the seal groove 40 and a first rib 48. The second transition portion 46 provides a transition between the outer edge of the seal groove 40 and the second rib 50.

Figure 6:
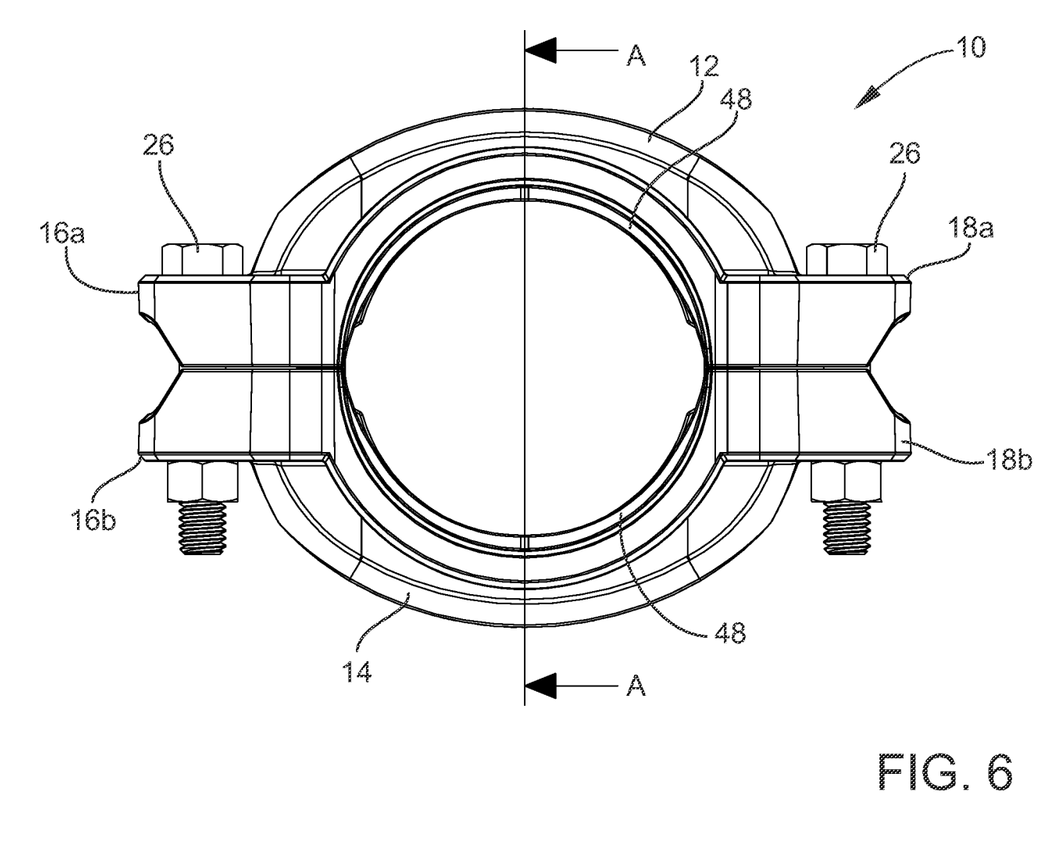
FIG. 6 is a side view of the coupling.

The first rib 48 contains a first end and a second end, as shown in FIG. 6. The first end and second end are disposed on the interior surface of the first coupling segment 12 and the second coupling segment 14 and between the seal grove 40 and an outer edge of the first coupling segment 12 and the second coupling segment 14. The first end and second end are disposed at a distance away from the first end 16*a*,*b* and second end 18*a*,*b* on the interior surface of the first coupling segment 12 and the second coupling segment 14. The first rib 48 preferably has a constant width, but increases in height from the first end to a point at a predetermined distance along the length of the first rib 48 and decreases in height from the point at the predetermined distance along the length of the first rib 48 to the second end of the first rib 48. Alternatively, the point at the predetermined distance along the first rib 48 may be the midpoint of the first rib 48, where the first rib 48 increases in height from the first end to the midpoint of the first rib 48, and then decrease in height from the midpoint to the second end of the first rib 48. The first rib 48 preferably has a constant width, but increases in height from the first end to a midpoint of the first rib 48, and then a decrease in height from the midpoint to the second end of the first rib 48. Alternatively, the first rib 48 may increase in height from the first end to a point at a first predetermined distance and maintain this height along the length of the first rib 48 between the point at the first predetermined distance until a point at a second predetermined distance, wherein the height of the first rib 48 decreases from the point at the second predetermined distance until the second end. The first end and the second end of the first rib 48 are flush with the interior surface of the first coupling segment 12 and the second coupling segment 14. The height is the distance of the first rib 48 from the interior surface of the coupling (12,14) to the upper edge and surface of the first rib 48.

The second rib 50, as shown in FIGS. 5 and 7, contains a first end and a second end. The first end and second end are disposed on the interior surface of the first coupling segment 12 and the second coupling segment 14 and between the seal grove 40 and an outer edge of the first coupling segment 12 and the second coupling segment 14. The first end and second end are disposed at a distance away from the first end 16a,b and second end 18a,b on the interior surface of the first coupling segment 12 and the second coupling segment 14. The second rib 50 preferably has a constant width, but increases in height from the first end to a midpoint of the second rib 50, and then a decrease in height from the midpoint to the second end of the second rib 50. Alternatively, the second rib 50 may increase in height from the first end to a point at a predetermined distance and maintain this height until along the length of the second rib 50 until a predetermined point, wherein the height of the second rib 50 decreases until the second end. The first end and the second end of the second rib 50 are flush with the interior surface of the first coupling segment 12 and the second coupling segment 14. The height is the distance of the second rib 50 from the interior surface of the coupling (12,14) to the upper edge and surface of the second rib 50.

At least one bore 52 extends from the exterior surface to the interior surface of either the first coupling segment 12 or the second coupling segment 14. As illustrated in FIGS. 1, 2, and 3, two bores 52 extend from the exterior surface to the interior surface of the first coupling segment 12. A bore 52 extends from the exterior surface of the first skirt 30 to the interior surface of the first coupling segment 12. Another bore 52 extends from the exterior surface of the second skirt 32 to the interior surface of the first coupling segment 12. Likewise, a bore 52 extends from the exterior surface of the first skirt 30 to the interior surface of the second coupling segment 14. Another bore 52 extends from the exterior surface of the second skirt 32 to the interior surface of the second coupling segment 14.

The seal 42 is annular or ring-shaped and contains a radially outer surface 58 that interacts with the inner surface of the first coupling segment 12 and the second coupling segment 14, as shown in FIG. 7. Specifically, the radially outer surface 58 of the seal 42 interacts and is received in the seal groove 40 of the first coupling segment 12 and the second coupling segment 14. The radially outer surface 58 contains at least one groove 60. Preferably, the radially outer surface 58 contains two or more grooves 60, and more preferably, the radially outer surface 58 contains a plurality of grooves 60, as illustrated in FIGS. 8-11. The grooves 60 are disposed between the edge portions 62a, 62b of the radially outer surface 58. As illustrated in FIG. 11, three grooves 60 are disposed within the radially outer surface 58, with two grooves 60 disposed adjacent each edge portion (62a,62b). A third groove 60 is disposed between the two grooves 60 adjacent each edge portion (62a,62b). A pair of side portions (64a,64b) extend axially downward from each edge portion (62a,62b). A pair of sealing surfaces (66a,66b) extend radially inwardly from a lower edge of each side portion (64a,64b). A center rib 68 is disposed internally of the seal 42, and preferably centrally located within the inner portion of the seal 42. A pair of gasket channels (70a,70b) are disposed on either side of the center rib 68 and formed within the inner portion of the seal 42. The gasket channels (70a, 70b) are bonded on one side by the center rib 68 and on the opposite side by an inner surface of the sealing surface (66a,66b). The gasket channels (70a,70b) are tubular channels that extend along the entire inner portion of the seal 42.

Figure 8:
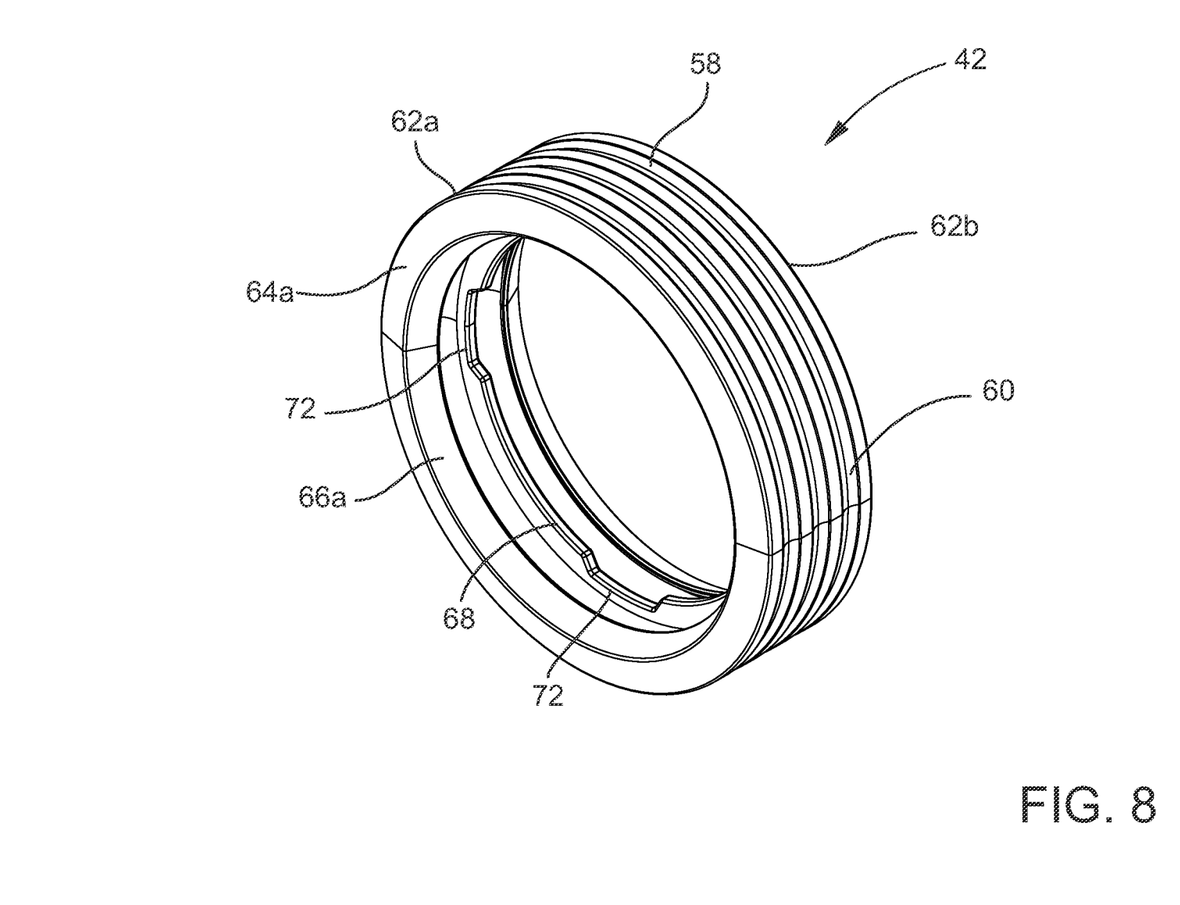
FIG. 8 is a perspective view of the seal.
Figure 9:
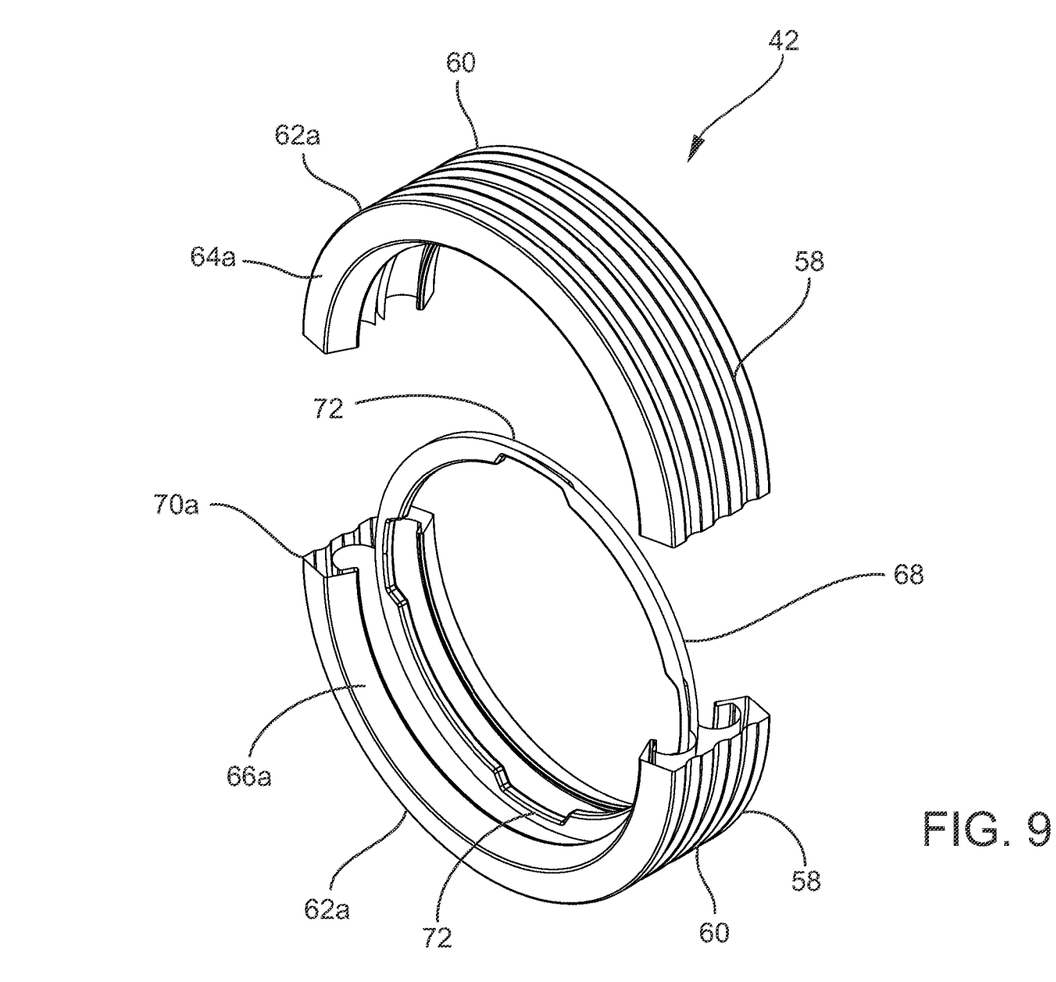
FIG. 9 is a partially exploded view of the seal.
Figure 10:
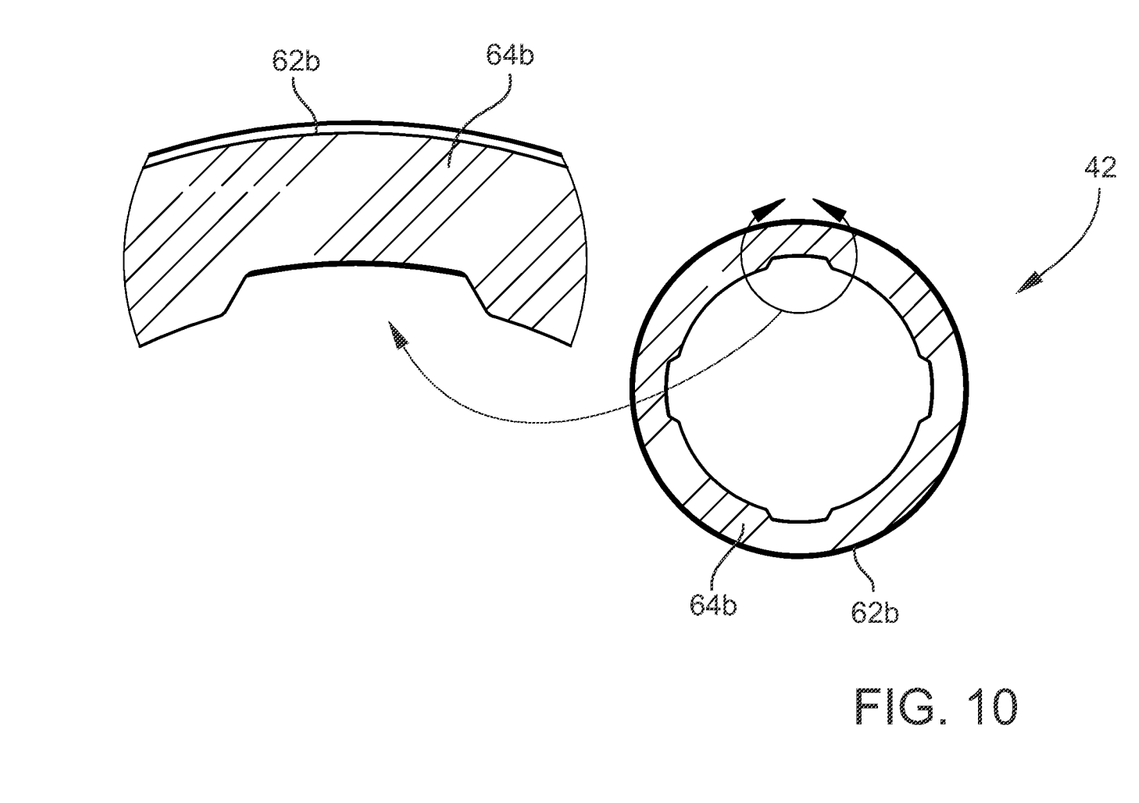
FIG. 10 is a side view of the seal, including a detail view of a notch.
Figure 11:
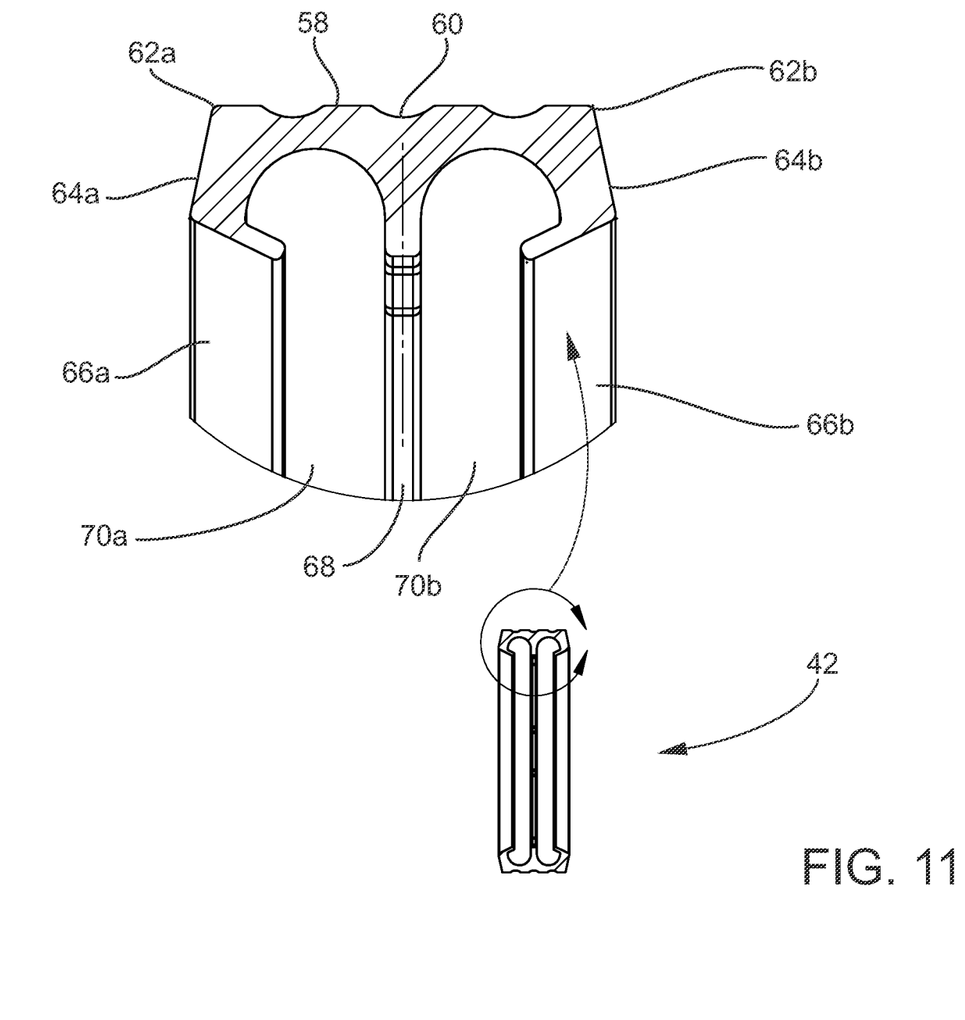
FIG. 11 is a cut-away view of the seal, including a detail view.

The center rib 68 contains at least one notch 72, preferably two or more notches 72, and more preferably a plurality of notches 72, as illustrated in FIGS. 8-10. The notches 72 are formed within the exterior surface of the center rib 68 and can be spaced an equal distance apart from each other along the exterior surface. As illustrated in FIG. 10, the center rib 68 can contain four notches. Each notch 72 has two opposed downwardly extending portions that extend downwardly at an angle from the exterior surface of the center rib 68 to a base portion. The notches 72 create a spaced-apart void in a section of the center rib 68 because the no side portions bound the notch 72 on either side.

The seal 42 may be made of rubber, plastic, polymer, elastomer, or any combination of these materials.

Figure 12:
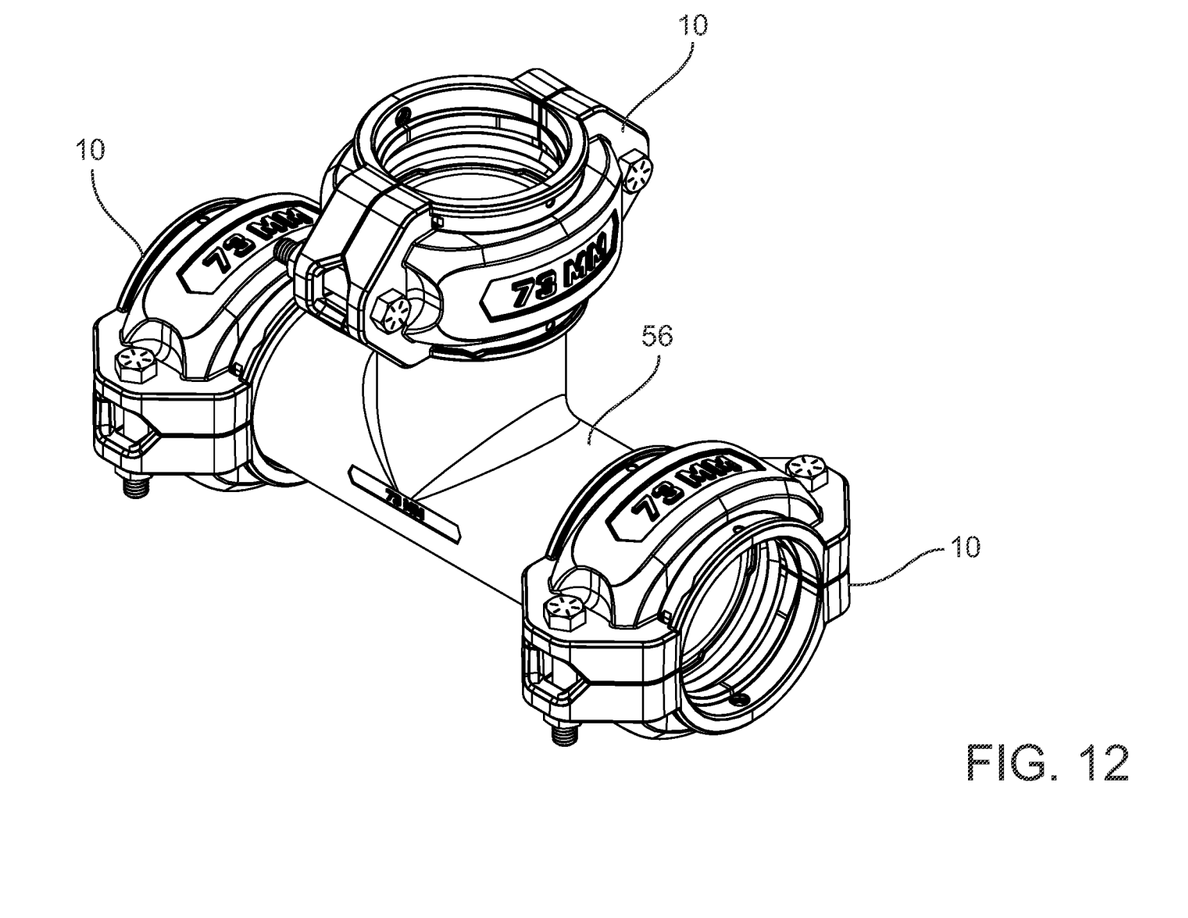
FIG. 12 is a perspective view of the three couplings engaged to separate ends of a pipe.

As illustrated in FIG. 12, the pipe coupling 10 is engaged to a pipe 56. The pipe coupling 10 is engaged to an end of the pipe 56 so that an end of another pipe (not shown) may be engaged within the pipe coupling 10 for joining the two pipes together. An embodiment illustrated in FIG. 12 shows a "T" shaped pipe 56 with three separate ends with openings into the inner passageway of the pipe 56. A pipe coupling 10 is engaged to each end of the pipe 56 for joining a separate pipe (not shown) to each end of the pipe 56 utilizing the pipe coupling 10 attached to the end.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A coupling for joining a first pipe segment to a second pipe segment, comprising:
 a first coupling segment having a first end, a second end, an outer surface, and an inner surface, fastener openings are disposed on the first end and the second end, the outer surface is contoured to define an arched shape that is higher towards an axial midpoint and lower towards the first end and the second end, the outer surface contains a band and a first skirt and a second skirt on each side of the band, a seal groove is defined on the inner surface between two outer edges of the first coupling segment, a first rib is disposed between the seal groove and one outer edge, the first rib has a first end and a second end, a height of the first rib increases as the first rib progresses from the first end to a predetermined point on the first rib and decreases in height from the predetermined point to the second end, and a second rib is disposed between the seal groove and the opposed outer edge, a first transition portion provides a transition between the outer edge of the seal groove and the first rib and a second transition portion provides a transition between the outer edge of the seal groove and the second rib;

a second coupling segment having a first end, a second end, an outer surface, and an inner surface, fastener openings are disposed on the first end and the second end, the outer surface is contoured to define an arched shape that is higher towards an axial midpoint and lower towards the first end and the second end, the outer surface contains a band and a first skirt and a second skirt on each side of the band, a seal groove is defined on the inner surface between two outer edges of the second coupling segment, a first rib is disposed between the seal groove and one outer edge, the first rib has a first end and a second end, a height of the first rib increases as the first rib progresses from the first end to a predetermined point on the first rib and decreases in height from the predetermined point to the second end, and a second rib is disposed between the seal groove and the opposed outer edge, a first transition portion provides a transition between the outer edge of the seal groove and the first rib and a second transition portion provides a transition between the outer edge of the seal groove and the second rib; and a seal.

2. The coupling according to claim 1, further comprising a first fastening device and a second fastening device, the first fastening device is received within the fastener openings on the first end of the first coupling segment and the second coupling segment and the second fastening device is received within the fastener openings on the second end of the first coupling device and the second coupling device, the first fastening device and the second fastening device selectively secure the first coupling segment to the second coupling segment for joining a first pipe segment to a second pipe segment.

3. The coupling according to claim 1, wherein the seal is received within the seal groove of the first coupling segment and the seal groove of the second coupling segment.

4. The coupling according to claim 1, wherein the predetermined point of the first coupling segment and the second coupling segment is the midpoint of the first rib, whereby the height of each of the first ribs is a distance from the inner surface of the first coupling segment and the second coupling segment to an upper edge of the first rib.

5. The coupling according to claim 1, wherein the second rib of the first coupling segment and the second coupling segment has a first end, a second end, and an upper edge, a height of the second rib increases as the second rib progresses from the first end to a predetermined point on the second rib and decreases in height from the predetermined point to the second end, whereby the height of the second rib is a distance from the inner surface of the first coupling segment and the second coupling segment to an upper edge of the second rib.

6. The coupling according to claim 1, wherein the second rib of the first coupling segment and the second coupling segment has a first end and a second end, a height of the second rib increases as the second rib progresses from the first end to a midpoint on the second rib and decreases in height from the midpoint to the second end.

7. The coupling according to claim 1, wherein the first coupling segment and the second coupling segment is composed of powdered coated aluminum.

8. The coupling according to claim 1, wherein the band of the first coupling segment or the second coupling segment contains an indicia marking portion.

9. A method for using a coupling to join a first pipe segment to a second pipe segment, comprising:

providing a first coupling segment having a first end, a second end, an outer surface, and an inner surface, fastener openings are disposed on the first end and the second end, the outer surface is contoured to define an arched shape that is higher towards an axial midpoint and lower towards the first end and the second end, the outer surface contains a band and a first skirt and a second skirt on each side of the band, a seal groove is defined on the inner surface between two outer edges of the first coupling segment, a first rib with an upper edge is disposed between the seal groove and one outer edge and a second rib with an upper edge is disposed between the seal groove and the opposed outer edge, a first transition portion provides a transition between the one outer edge of the seal groove and the first rib and a second transition portion provides a transition between the opposed outer edge of the seal groove and the second rib;

a second coupling segment having a first end, a second end, an outer surface, and an inner surface, fastener openings are disposed on the first end and the second end, the outer surface is contoured to define an arched shape that is higher towards an axial midpoint and lower towards the first end and the second end, the outer surface contains a band and a first skirt and a second skirt on each side of the band, a seal groove is defined on the inner surface between two outer edges of the second coupling segment, a first rib with an upper edge is disposed between the seal groove and one outer edge and a second rib with an upper edge is disposed between the seal groove and the opposed outer edge, a first transition portion provides a transition between the one outer edge of the seal groove and the first rib and a second transition portion provides a transition between the opposed outer edge of the seal groove and the second rib, wherein for the first coupling segment and the second coupling segment, the first rib and the second rib increase in height from a first end to a predetermined distance along the first rib and the second rib, and at the predetermined distance the first rib and the second rib decrease in height towards a second end;

a seal;

a first pipe segment; and a second pipe segment;

placing an end of the second pipe segment between the first coupling segment and the second coupling segment; and securing the first coupling segment to the second coupling segment.

10. The method for using a coupling to join a first pipe segment to a second pipe segment according to claim 9, wherein the first coupling segment and the second coupling segment are engaged by at least one fastening device.

11. The method for using a coupling to join a first pipe segment to a second pipe segment according to claim 9, wherein the seal is positioned within the seal groove of the first coupling segment and the second coupling segment.

12. The method for using a coupling to join a first pipe segment to a second pipe segment according to claim 9, wherein the seal comprises:

a radially outer surface that contains at least one groove disposed between edge portions of the radially outer surface;

a pair of side portions that extend axially downward from the edge portions of the radially outer surface;

a pair of sealing surfaces extending radially inwardly from the side portions;

a center rib disposed internally of the seal;

a pair of gasket channels disposed on either side of the center rib that are tubular channels extending internally of the seal.

13. The method for using a coupling to join a first pipe segment to a second pipe segment according to claim 9, wherein the first coupling segment and the second coupling segment is composed of powdered coated aluminum.

* * * * *